(12) United States Patent
Kanezaki et al.

(10) Patent No.: US 6,663,344 B2
(45) Date of Patent: Dec. 16, 2003

(54) COPPER-BASED SINTERED ALLOY BEARING AND MOTOR FUEL PUMP

(75) Inventors: Noboru Kanezaki, Columbus, IN (US); Tsuneo Murayama, Niigata (JP); Yoshio Ebihara, Kariya (JP)

(73) Assignees: Mitsubishi Materials Corporation, Tokyo (JP); Denso Corporation, Aichi (JP)

(*) Notice: Subject to any disclaimer, the term of this patent is extended or adjusted under 35 U.S.C. 154(b) by 106 days.

(21) Appl. No.: 10/102,803

(22) Filed: Mar. 22, 2002

(65) Prior Publication Data

US 2002/0197149 A1 Dec. 26, 2002

(30) Foreign Application Priority Data

Mar. 28, 2001 (JP) .................................... P2001-093180
Mar. 28, 2001 (JP) .................................... P2001-093181

(51) Int. Cl.$^7$ ............................................. F04D 29/04
(52) U.S. Cl. ..................... 415/229; 384/279; 384/907
(58) Field of Search .................... 415/55.1, 170.1, 415/229; 384/279, 902, 907, 912, 913

(56) References Cited

U.S. PATENT DOCUMENTS 4,999,257 A * 3/1991 Imai ........................ 428/555
5,114,468 A    5/1992 Akutsu et al.
6,086,257 A * 7/2000 Lee ......................... 384/279
6,165,246 A * 12/2000 Kira et al. .................. 75/247
6,524,365 B1 * 2/2003 Kanezaki et al. ............ 75/243

FOREIGN PATENT DOCUMENTS

| JP | S57-070247 | 4/1982 |
| JP | S57-073150 | 5/1982 |
| JP | 4-339 | 6/1992 |
| JP | 5-26237 | 2/1993 |
| JP | H07-118777 | 5/1995 |

* cited by examiner

Primary Examiner—Edward K. Look
Assistant Examiner—Dwayne J. White
(74) Attorney, Agent, or Firm—Rader, Fishman & Grauer PLLC

(57) ABSTRACT

The Cu-based sintered alloy bearing of the present invention is made of a Cu-based sintered alloy with a composition consisting of, by weight, Ni: 10 to 25%, Zn: 10 to 25%, P: 0.1 to 0.9%, C: 0 to 5%, molybdenum disulfide: 0.5 to 5%, and Cu and inevitable impurities as the balance. The Cu-based sintered alloy has a texture from a Cu—P compound, free graphite, and molybdenum disulfide being dispersed in a base material made of a solid solution phase of a Cu—Ni—Zn alloy, and a porosity is within a range of 5 to 25%.

9 Claims, 1 Drawing Sheet

COPPER-BASED SINTERED ALLOY BEARING AND MOTOR FUEL PUMP

BACKGROUND OF THE INVENTION

1. Field of the Invention

The present invention relates to a Cu-based sintered alloy bearing suitable for use in a motor fuel pump that is reduced in size and operates with a high driving force, and relates to a motor fuel pump therewith.

2. Background Art

An engine that employs, as a fuel, a liquid fuel such as gasoline or gas oil is generally equipped with a motor fuel pump. For example, that having a structure as shown in FIG. 1 is known as a motor fuel pump for a gasoline engine.

This motor fuel pump has a structure such that, in a casing 1, a rotating shaft 2 arranged at both ends of a motor 5 is supported by bearings 3a and 3b and an impeller 4 is inserted at one end of the rotating shaft 2, and a narrow gasoline passage is formed along the outer peripheral surface of the impeller 4, the outer peripheral surface of a motor (armature) 5 and the space (not shown) between the bearings 3a and 3b and the rotating shaft 2. The bearings 3a and 3b are made of various Cu-based sintered alloys.

On rotation of the impeller 4 by the rotation of the motor 5, gasoline is introduced into the casing 1 by the rotation of the impeller 4 and the introduced gasoline is supplied into a separately arranged gasoline engine by passing through the gasoline passage formed along the outer peripheral surface of the impeller 4 and the outer peripheral surface of the motor 5. At this time, a trace amount of a fuel passes through the space between the inner peripheral surface of both bearings 3a and 3b and the outer peripheral surface of the rotating shaft 2 and serves as lubricating oil for sliding the rotating shaft.

With recent remarkable weight reduction and realization of high performance in automobile engines, size reduction has strongly been required for motor fuel pumps used in the engines. In the case of the motor fuel pump having the structure described above, high driving force, that is, high rotating speed, is required to secure sufficient discharging performance and to reduce the size. Under these conditions, higher strength and higher wear resistance are required for bearings.

However, no Cu-based sintered alloy bearings used in a conventional motor fuel pumps have sufficient strength and sufficient wear resistance, and therefore the wear At increases rapidly. Wear is accelerated when a liquid fuel contains sulfur or a compound thereof as impurities, thus resulting in relatively short service life.

BRIEF SUMMARY OF THE INVENTION

To develop a bearing suited for use in a motor fuel pump, the bearing being smaller and operated with a high driving force, the present inventors have performed intensive research. As a result, they have succeeded in the development of a Cu-based sintered alloy bearing and a motor fuel pump described below.

The Cu-based sintered alloy bearing according to the first aspect of the present invention is made of a Cu-based sintered alloy with a composition consisting of, by weight, Ni: 10 to 25%, Zn: 10 to 25%, P: 0.1 to 0.9%, molybdenum disulfide: 0.5 to 5%, and Cu and inevitable impurities as the balance. The Cu-based sintered alloy has a texture from a Cu-P compound and molybdenum disulfide being dispersed in a base material made of a solid solution phase of a Cu—Ni—Zn alloy and the porosity thereof is within a range of 5 to 25%.

The Cu-based sintered alloy bearing according to the second aspect of the present invention is made of a Cu-based sintered alloy with a composition consisting of, by weight, Ni: 10 to 25%, Zn: 10 to 25%, P: 0.1 to 0.9%, C: 5% or lower, molybdenum disulfide: 0.5 to 5%, and Cu and inevitable impurities as the balance. The Cu-based sintered alloy has such a texture that a Cu—P compound, free graphite and molybdenum disulfide are dispersed in base material made of a solid solution phase of a Cu—Ni—Zn alloy and a porosity is within a range of 5 to 25%.

According to the Cu-based sintered alloy bearing with one of the constitutions described above, a liquid fuel is supplied from the outer peripheral surface of a bearing to the inner peripheral surface of a bearing through pores in the bearing and a fluid lubricating film is formed on the inner peripheral surface of the bearing by this liquid fuel. A frictional resistance applied on a bearing during high-speed rotation of a motor is relieved by this fluid lubricating film. Although the wear resistance is lowered as pores are formed, dispersion of a hard Cu—P compound and $MoS_2$ (or $MoS_2$ and free graphite) that have high lubricity in a base material made of a solid solution phase of a Cu—Ni—Zn alloy covers lowering of the wear resistance. Therefore, the Cu-based sintered alloy bearing exhibits excellent wear resistance even under the environment of exposure to a high pressure/high speed flow of a liquid fuel, in cooperation with high strength and excellent corrosion resistance of the Cu—Ni—Zn alloy that constitutes the base material. Also the Cu-based sintered alloy exhibits excellent corrosion resistance to a liquid fuel containing sulfur and a compound thereof as impurities.

The motor fuel pump according to the third aspect of the present invention comprises a casing, a rotating shaft arranged in the casing, bearings that rotatably support the rotating shaft to the casing, and an impeller fixed to the rotating shaft, and bearings are Cu-based sintered alloy bearings of the first or second aspect.

According to this motor fuel pump, a long service life can be obtained even at a high rotating speed and size reduction can also be achieved.

DETAILED DESCRIPTION OF THE INVENTION

Figure 1:
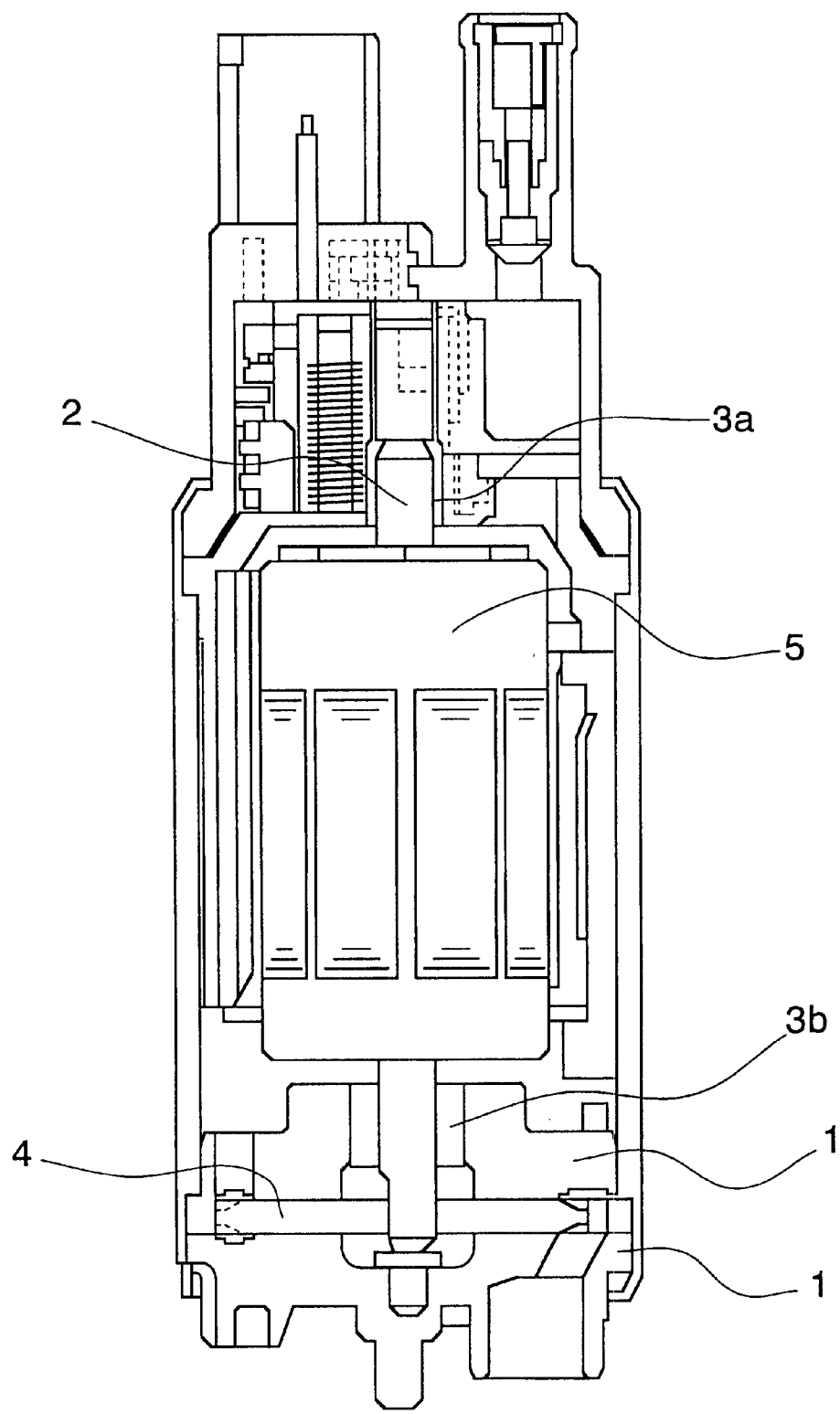
FIG. 1 is a cross-sectional view of a motor fuel pump for a gasoline engine.

Embodiments of a Cu-based sintered alloy bearing and a motor fuel pump of the present invention will be described below. In all embodiments, the shape of the Cu-based sintered alloy bearing is not specifically limited and may have any shape and size. For example, it may have the same shape and size as those of bearings 3a and 3b shown in FIG. 1.

First Embodiment

The Cu-based sintered alloy bearing according to the first aspect of the present invention is made of a Cu-based sintered alloy with a composition consisting of, by weight, Ni: 10 to 25%, Zn: 10 to 25%, P: 0.1 to 0.9%, molybdenum disulfide: 0.5 to 5%, and Cu and inevitable impurities as the balance. The Cu-based sintered alloy has a texture from a Cu—P compound and molybdenum disulfide being dispersed in a base material made of a solid solution phase of a Cu—Ni—Zn alloy and the porosity thereof is within a range of 5 to 25%.

The reason the composition and porosity of the Cu-based sintered body that constitutes the bearing of this embodiment were limited as described above will be described below.

(1) Composition
(a) Ni and Zn

These components have an action of being incorporated into Cu in the form of a solid solution to form a base material made of a solid solution phase of a Cu—Ni—Zn alloy, thereby improving the strength and the corrosion resistance of a bearing.

Even when the Ni content is lower than 10% by weight or higher than 25% by weight, the strength of the bearing is reduced. More preferable Ni content is within a range of 15 to 20% by weight.

When the Zn content is lower than 10% by weight, the corrosion resistance of the bearing is lowered. On the other hand, when the content is higher than 25% by weight, the strength is rapidly reduced. More preferable Zn content is within a range of 15 to 20% by weight.

(b) P

The component P has an action of improving the sinterability, thereby contributing to an improvement in strength of a bearing, and forming a hard Cu—P alloy dispersed in a base material, thereby improving the wear resistance.

When the P content is less than 0.1% by weight, a desired effect of improving the action described above cannot be obtained. On the other hand, when the content is higher than 0.9% by weight, the strength tends to be reduced, thus making it difficult to stably secure a desired high strength. More preferably the P content is within a range of 0.3 to 0.6% by weight.

(c) $MoS_2$ $MoS_2$ is dispersed and distributed in a base material in the form of $MoS_2$ particles and has an action of imparting excellent lubricity to a bearing and improving the wear resistance of the bearing. When the $MoS_2$ content is lower than 0.5% by weight, a desired effect of improving the lubricity cannot be obtained. On the other hand, when the content is higher than 5% by weight, a reduction in strength cannot be avoided. More preferably the $MoS_2$ content is within a range of 1 to 3% by weight.

(2) Porosity

Pores distributed throughout a base material of a Cu—Ni—Zn alloy have an action of relieving a strong friction and a high surface pressure applied on a bearing under a high pressure/high speed flow of a liquid fuel as described above, thereby remarkably suppress the wear of the bearing. When the porosity is lower than 5%, the proportion of the pores distributed throughout the base material is too small to sufficiently exert the action described above. On the other hand, when the porosity is higher than 25%, the strength of the bearing is rapidly reduced. More preferable porosity is within a range of 10 to 20%.

Second Embodiment

While only $MoS_2$ was used as the lubricating component in the first embodiment, the Cu-based sintered alloy bearing according to the second aspect of the present invention further comprises 5% by weight or less of carbon as the lubricating component, in addition to $MoS_2$. That is, the Cu-based sintered alloy bearing according to the second aspect is made of a Cu-based sintered alloy with a composition consisting of, by weight, Ni: 10 to 25%, Zn: 10 to 25%, P: 0.1 to 0.9%, C: 5% or less, molybdenum disulfide: 0.5 to 5%, and Cu and inevitable impurities as the balance. The Cu-based sintered alloy has a texture from a Cu—P compound, free graphite, and molybdenum disulfide being dispersed in a base material made of a solid solution phase of a Cu—Ni—Zn alloy, and the porosity thereof is within a range of 5 to 25%.

The reason of the limitation of constituent components other than carbon is the same as that in the first embodiment.

Carbon is mainly dispersed in a base material in the form of particles of free graphite, together with $MoS_2$ particles, thereby imparting excellent lubricity to a bearing in the state where it coexists with $MoS_2$ particles, and to contribute to improving the wear resistance of the bearing.

When the carbon content of the Cu-based sintered alloy is higher than 5% by weight, the strength of the bearing is reduced. A more preferable carbon content is within a range of 0.5 to 5% by weight. When the carbon content is lower than 0.5% by weight, the effect of improving the lubricity by the addition of carbon is less likely to be obtained. Also when the carbon content is lower than 0.5% by weight, almost the same effect as that of the first embodiment can be obtained by further comprising $MoS_2$ particles, in addition to free carbon. A more preferable carbon content of the Cu-based sintered alloy is within a range of 1 to 3% by weight. When the carbon content is within this range, good balance between the strength and the wear resistance of the bearing is achieved.

Embodiment of Motor Fuel Pump

As shown in FIG. 1, the motor fuel pump according to one embodiment of the present invention comprises a casing 1, a rotating shaft 2 arranged in the casing, bearings 3a and 3b that rotatably support the rotating shaft 2 to the casing 1, and an impeller 4 fixed to the rotating shaft 2. Bearings are Cu-based sintered alloy bearings of the first or second aspect. The other constitution may be the same as that shown in FIG. 1. The motor fuel pump of the present invention is not limited to the structure shown in FIG. 1 and may be a motor fuel pump having any conventionally known structure.

According to this motor fuel pump, a long service life can be obtained even at a high rotating speed and size reduction can also be achieved.

EXAMPLES

The following Examples of the present invention demonstrate effects thereof.

Experiment 1

As raw powders, various Cu—Ni—Zn alloy powers having different Ni and Zn contents, Cu—P powder (containing 33% by weight of P) and $MoS_2$ powder were prepared. The Cu—Ni—Zn alloy power is formed by a water atomization method and has an average particle diameter of 45 µm. The Cu—P alloy powder is a water-atomized powder having an average particle diameter of 45 µm. The $MoS_2$ powder has an average particle diameter of 75 µm.

In accordance with each predetermined formulation, these raw powders were mixed in a ball mill for 40 minutes and compressed under a predetermined pressure within a range of 150 to 300 MPa to obtain a green compact. The resulting green compact was sintered in an ammonia decomposed gas atmosphere under the conditions of a predetermined temperature within a range of 750 to 900° C. for 40 minutes to produce bearings of Examples 1 to 21. Each composition and porosity of the Cu-based sintered that constitute Examples 1 to 21 are as shown in Table 1. The bearing is in the form of a cylinder having a size of 9 mm in outer diameter×5 mm in inner diameter×6 mm in height.

Using an optical microscope (magnification: ×200), random cross-sections of Examples 1 to 21 were observed. As a result, all samples had a texture from a fine Cu—P alloy and fine $MoS_2$ being dispersed and distributed in a base material made of a solid solution phase of a Cu—Ni—Zn alloy, and pores also existed.

Under the same conditions as in Examples 1 to 21, except for replacing by the composition shown in Table 1, bearings of Comparative Examples 1 to 10 were produced. All bearings of Comparative Examples 1 to 10 were made of a Cu-based sintered alloy wherein one parameter among the alloying component content and porosity was not within the scope of the present invention.

Each of bearing of Examples 1 to 21 and Comparative Examples 1 to 10 was mounted in a fuel pump having an overall size of 110 mm in length×40 mm in diameter and the fuel pump was arranged in a gasoline tank. Under the conditions of an impeller rotating speed of 3000 (minimum rotating speed) to 12000 (maximum rotating speed), a gasoline flow rate of 45 liters/hr (minimum flow rate) to 170 liters/hr (maximum flow rate), a pressure applied on a bearing from a high-speed rotating shaft of maximum 300 KPa and a test time of 150 hours, actual tests were conducted and maximum wear depths at a bearing surface after the tests were measured. According to the conditions of the actual machine test, gasoline passes through narrow spaces in the pump at high speed and high pressure is applied to the bearing from the rotating shaft that rotates at high speed, and also the bearing is exposed to the gasoline that flows at a high flow rate.

The measurement results are shown in Table 1. For the purpose of evaluating the strength of the bearing, the crushing strengths of various bearings are also shown.

As is apparent from the results of Table 1, all bearings of Examples 1 to 21 are made of a Cu-based sintered alloy having a high strength and also exhibited excellent wear resistance even under a high pressure/high speed flow when used as a bearing of a motor fuel pump by excellent corrosion resistance of a solid solution phase of a Cu—Ni—Zn alloy, pores dispersed and distributed throughout a base material and a hard Cu—P alloy, and an action of $MoS_2$ having a high lubricity.

In bearings of Comparative Examples 1 to 10, since the component content or porosity of the Cu-based sintered alloy is not within the scope of the present invention, the strength or wear resistance was lowered.

Experiment 2

Using graphite powder having an average particle diameter of 75 $\mu$m, in addition to raw materials used in Example 1, bearings of Examples 22 to 46 were produced. Each composition and porosity of these bearings are as shown in Table 2 and Table 3.

Using an optical microscope (magnification: ×200), random cross-sections of Examples 22 to 46 were observed. As a result, all samples had a texture wherein a fine Cu—P alloy, free graphite and fine $MoS_2$ are dispersed and distributed in a base material made of a solid solution phase of a Cu—Ni—Zn alloy and pores also exist.

Under the same conditions as in Examples 22 to 46, except for substitution by the compositions shown in Table 4, bearings of Comparative Examples 11 to 22 were produced. All bearings of Comparative Examples 11 to 22 are made of a Cu-based sintered alloy wherein any parameter among the alloying component content and porosity is not within the, scope of the present invention.

Each of the bearings of Examples 22 to 46 and Comparative Examples 11 to 22 was mounted in a fuel pump having

| Classification | | Ni | Zn | P | $MoS_2$ | Cu + impurities | Porosity (%) | Crushing strength (N/mm$^2$) | Maximum wear depth ($\mu$m) |
|---|---|---|---|---|---|---|---|---|---|
| Examples | 1 | 10.6 | 17.4 | 0.42 | 2.23 | balance | 14.8 | 170 | 1.0 |
| | 2 | 15.0 | 17.1 | 0.38 | 2.31 | balance | 15.4 | 176 | 1.2 |
| | 3 | 17.8 | 16.9 | 0.41 | 2.35 | balance | 14.9 | 186 | 1.0 |
| | 4 | 20.4 | 17.0 | 0.45 | 2.31 | balance | 15.5 | 175 | 1.0 |
| | 5 | 24.5 | 17.3 | 0.39 | 2.29 | balance | 15.7 | 171 | 1.1 |
| | 6 | 17.1 | 10.4 | 0.43 | 2.36 | balance | 14.7 | 193 | 1.4 |
| | 7 | 17.6 | 15.5 | 0.40 | 2.29 | balance | 15.6 | 190 | 1.3 |
| | 8 | 17.3 | 20.7 | 0.42 | 2.30 | balance | 15.2 | 162 | 1.3 |
| | 9 | 17.2 | 23.6 | 0.41 | 2.25 | balance | 15.3 | 154 | 1.3 |
| | 10 | 17.7 | 17.2 | 0.12 | 2.28 | balance | 15.0 | 151 | 1.4 |
| | 11 | 17.0 | 17.4 | 0.22 | 2.33 | balance | 15.3 | 162 | 1.3 |
| | 12 | 16.9 | 17.8 | 0.67 | 2.41 | balance | 15.4 | 150 | 1.1 |
| | 13 | 17.6 | 17.3 | 0.85 | 2.34 | balance | 15.4 | 137 | 1.0 |
| | 14 | 17.5 | 17.5 | 0.41 | 0.57 | balance | 14.5 | 221 | 2.4 |
| | 15 | 17.2 | 17.4 | 0.44 | 1.61 | balance | 15.2 | 210 | 2.2 |
| | 16 | 17.1 | 17.5 | 0.39 | 2.88 | balance | 15.1 | 163 | 1.2 |
| | 17 | 17.7 | 17.3 | 0.38 | 4.86 | balance | 15.5 | 151 | 1.1 |
| | 18 | 17.7 | 17.2 | 0.41 | 2.30 | balance | 5.4 | 218 | 1.4 |
| | 19 | 16.9 | 17.8 | 0.45 | 2.48 | balance | 10.8 | 207 | 1.1 |
| | 20 | 17.4 | 17.0 | 0.41 | 2.28 | balance | 19.7 | 155 | 1.3 |
| | 21 | 17.2 | 17.5 | 0.43 | 2.35 | balance | 24.5 | 138 | 1.8 |
| Comparative Examples | 1 | 9.1* | 17.0 | 0.43 | 2.32 | balance | 15.5 | 92 | 1.2 |
| | 2 | 26.3* | 17.8 | 0.39 | 2.27 | balance | 14.8 | 96 | 1.1 |
| | 3 | 17.1 | 8.6* | 0.42 | 2.34 | balance | 15.4 | 94 | 1.2 |
| | 4 | 16.9 | 26.6* | 0.40 | 2.29 | balance | 15.7 | 90 | 1.0 |
| | 5 | 17.6 | 17.6 | 0.03* | 2.30 | balance | 15.6 | 103 | 6.7 |
| | 6 | 17.2 | 17.2 | 1.07* | 2.32 | balance | 15.1 | 82 | 1.3 |
| | 7 | 17.7 | 17.5 | 0.43 | 0.31* | balance | 15.3 | 235 | 11.4 |
| | 8 | 17.2 | 17.1 | 0.44 | 5.87* | balance | 14.9 | 79 | 1.2 |
| | 9 | 17.5 | 16.8 | 0.41 | 2.35 | balance | 3.8* | 237 | 10.1 |
| | 10 | 17.3 | 16.8 | 0.39 | 2.41 | balance | 26.6* | 81 | 2.1 |

Note: symbol * denotes a value that is not within the scope of the present invention an overall size of 110 mm in length×40 mm in diameter and the fuel pump was arranged in a gasoline tank. Under the conditions of an impeller rotating speed of 3000 (minimum rotating speed) to 9000 (maximum rotating speed), a gasoline flow rate of 45 liters/hr (minimum flow rate) to 130 liters/hr (maximum flow rate), a pressure applied on a bearing from a high-speed rotating shaft of maximum 300 KPa and a test time of 220 hours, actual machine tests were conducted and maximum wear depths at bearing surfaces after the tests were measured. According to the conditions of the actual machine tests, gasoline passes through narrow spaces in the pump at high speed and high pressure is applied to the bearing from the rotating shaft that rotates at high speed, and also the bearing is exposed to the gasoline that flows at a high flow rate.

The measurement results are shown in Table 2 to Table 4. For the purpose of evaluating the strength of the bearing, the crushing strengths of various bearings are also shown.

TABLE 2

| Classification | | Ni | Zn | P | C | MoS$_2$ | Cu + impurities | Porosity (%) | Crushing strength (N/mm$^2$) | Maximum wear depth (μm) |
|---|---|---|---|---|---|---|---|---|---|---|
| Examples | 22 | 10.4 | 17.9 | 0.46 | 1.54 | 1.53 | balance | 15.7 | 138 | 1.2 |
| | 23 | 15.5 | 17.6 | 0.43 | 1.50 | 1.43 | balance | 15.0 | 146 | 1.2 |
| | 24 | 17.2 | 17.7 | 0.47 | 1.52 | 1.51 | balance | 15.4 | 158 | 1.1 |
| | 25 | 19.6 | 17.6 | 0.41 | 1.51 | 1.57 | balance | 15.3 | 153 | 1.2 |
| | 26 | 24.3 | 17.1 | 0.44 | 1.49 | 1.48 | balance | 15.9 | 142 | 1.1 |
| | 27 | 17.0 | 10.8 | 0.45 | 1.63 | 1.55 | balance | 14.2 | 169 | 1.6 |
| | 28 | 17.4 | 15.6 | 0.42 | 1.58 | 1.52 | balance | 15.1 | 161 | 1.4 |
| | 29 | 17.1 | 18.8 | 0.48 | 1.55 | 1.58 | balance | 15.8 | 154 | 1.2 |
| | 30 | 17.5 | 24.5 | 0.45 | 1.57 | 1.56 | balance | 14.9 | 130 | 1.1 |
| | 31 | 17.5 | 16.2 | 0.13 | 1.56 | 1.57 | balance | 15.5 | 147 | 1.6 |
| | 32 | 16.8 | 17.0 | 0.24 | 1.56 | 1.56 | balance | 14.7 | 152 | 1.5 |
| | 33 | 16.7 | 17.4 | 0.66 | 1.52 | 1.52 | balance | 15.3 | 148 | 1.1 |

TABLE 3

| Classification | | Ni | Zn | P | C | MoS$_2$ | Cu + impurities | Porosity (%) | Crushing strength (N/mm$^2$) | Maximum wear depth (μm) |
|---|---|---|---|---|---|---|---|---|---|---|
| Examples | 34 | 17.3 | 16.3 | 0.87 | 1.58 | 1.61 | balance | 15.7 | 145 | 1.2 |
| | 35 | 17.0 | 17.1 | 0.38 | 0.54 | 1.63 | balance | 14.9 | 209 | 1.6 |
| | 36 | 16.8 | 17.6 | 0.46 | 1.03 | 1.59 | balance | 15.4 | 170 | 1.4 |
| | 37 | 17.5 | 16.1 | 0.43 | 2.93 | 1.57 | balance | 15.7 | 133 | 1.2 |
| | 38 | 16.5 | 17.6 | 0.41 | 4.93 | 1.58 | balance | 15.2 | 124 | 1.1 |
| | 39 | 17.1 | 17.5 | 0.44 | 1.62 | 0.52 | balance | 15.4 | 210 | 1.6 |
| | 40 | 17.6 | 17.0 | 0.40 | 1.57 | 1.02 | balance | 15.7 | 187 | 1.4 |
| | 41 | 17.2 | 17.3 | 0.46 | 1.59 | 3.05 | balance | 15.6 | 135 | 1.1 |
| | 42 | 17.2 | 17.2 | 0.42 | 1.69 | 4.86 | balance | 14.7 | 124 | 1.0 |
| | 43 | 16.9 | 16.9 | 0.45 | 1.68 | 1.59 | balance | 5.2 | 223 | 1.8 |
| | 44 | 17.1 | 17.2 | 0.47 | 1.56 | 1.61 | balance | 10.7 | 218 | 1.2 |
| | 45 | 16.9 | 16.6 | 0.39 | 1.62 | 1.58 | balance | 19.3 | 141 | 1.3 |
| | 46 | 17.4 | 17.4 | 0.43 | 1.55 | 1.64 | balance | 24.4 | 125 | 1.6 |

TABLE 4

| Classification | | Ni | Zn | P | C | MoS$_2$ | Cu + impurities | Porosity (%) | Crushing strength (N/mm$^2$) | Maximum wear depth (μm) |
|---|---|---|---|---|---|---|---|---|---|---|
| Comparative Embodiments | 11 | 9.1* | 16.1 | 0.41 | 1.65 | 1.63 | balance | 15.8 | 87 | 1.5 |
| | 12 | 26.8* | 15.7 | 0.39 | 1.59 | 1.54 | balance | 15.7 | 90 | 1.3 |
| | 13 | 17.3 | 8.6* | 0.44 | 1.58 | 1.51 | balance | 15.2 | 98 | 1.8 |
| | 14 | 17.0 | 26.6* | 0.46 | 1.62 | 1.57 | balance | 15.9 | 94 | 1.4 |
| | 15 | 17.2 | 17.6 | 0.03* | 1.67 | 1.52 | balance | 15.4 | 88 | 6.8 |
| | 16 | 17.5 | 17.2 | 0.96* | 1.58 | 1.55 | balance | 15.6 | 103 | 1.9 |
| | 17 | 17.6 | 17.4 | 0.40 | 0.33* | 1.50 | balance | 15.5 | 210 | 12.3 |
| | 18 | 17.3 | 16.8 | 0.38 | 5.77* | 1.64 | balance | 15.9 | 90 | 1.5 |
| | 19 | 17.5 | 17.0 | 0.43 | 1.56 | 0.31* | balance | 15.0 | 209 | 11.3 |
| | 20 | 17.4 | 17.3 | 0.42 | 1.51 | 5.77* | balance | 15.1 | 92 | 1.3 |
| | 21 | 17.1 | 17.5 | 0.45 | 1.58 | 1.57 | balance | 3.8* | 235 | 10.8 |
| | 22 | 17.7 | 17.1 | 0.41 | 1.57 | 1.66 | balance | 26.4* | 78 | 3.2 |

Note: symbol * denotes a value that is not within the scope of the present invention As is apparent from the results of Table 2 and Table 3, all bearings of Examples 22 to 46 are made of a Cu-based sintered alloy having a high strength and also exhibited excellent wear resistance even under a high pressure/high speed flow when used as a bearing of a motor fuel pump due to excellent corrosion resistance of a solid solution phase of a Cu—Ni—Zn alloy, pores dispersed and distributed throughout a base material and a hard Cu—P alloy, and an action of free carbon and $MoS_2$ that have a high lubricity.

In bearings of Comparative Examples 11 to 22, since the component content or porosity of the Cu-based sintered alloy is not within the scope of the present invention, the strength or wear resistance was reduced.

What is claimed is:

1. A Cu-based sintered alloy bearing made of a Cu-based sintered alloy with a composition consisting of, by weight, Ni: 10 to 25%, Zn: 10 to 25%, P: 0.1 to 0.9%, molybdenum disulfide: 0.5 to 5%, and Cu and inevitable impurities as the balance, the Cu-based sintered alloy having a texture from a Cu—P compound and molybdenum disulfide being dispersed in a base material made of a solid solution phase of a Cu—Ni—Zn alloy, and a porosity is within a range of 5 to 25%.

2. A Cu-based sintered alloy bearing made of a Cu-based sintered alloy with a composition consisting of, by weight, Ni: 10 to 25%, Zn: 10 to 25%, P: 0.1 to 0.9%, C: 5% or less, molybdenum disulfide: 0.5 to 5%, and Cu and inevitable impurities as the balance, the Cu-based sintered alloy having a texture from a Cu—P compound, free graphite, and molybdenum disulfide being dispersed in a base material made of a solid solution phase of a Cu—Ni—Zn alloy, and a porosity is within a range of 5 to 25%.

3. The Cu-based sintered alloy bearing according to claim 2, wherein the carbon content of the Cu-based sintered alloy is within a range of 0.5 to 5% by weight.

4. The Cu-based sintered alloy bearing according to claim 1 or 2, wherein the Ni content of the Cu-based sintered alloy is within a range of 15 to 20% by weight and the Zn content is within a range of 15 to 20% by weight.

5. The Cu-based sintered alloy bearing according to claim 1 or 2, wherein the P content of the Cu-based sintered alloy is within a range of 0.3 to 0.6% by weight.

6. The Cu-based sintered alloy bearing according to claim 1 or 2, wherein the molybdenum disulfide content of the Cu-based sintered alloy is within a range of 1 to 3% by weight.

7. The Cu-based sintered alloy bearing according to claim 1 or 2, wherein the porosity of the Cu-based sintered alloy is within a range of 10 to 20%.

8. The Cu-based sintered alloy bearing according to claim 2, wherein the carbon content of the Cu-based sintered alloy is within a range of 1 to 3% by weight.

9. A motor fuel pump comprising:

a casing, a rotating shaft arranged in the casing, bearings that rotatably support the rotating shaft to the casing, and a impeller fixed to the rotating shaft, wherein bearings are Cu-based sintered alloy bearings of claim 1 or 2.

* * * * *